(12) United States Patent
Matsui

(10) Patent No.: US 6,946,634 B2
(45) Date of Patent: Sep. 20, 2005

(54) OPTICAL PICKUP DEVICE

(75) Inventor: Tsutomu Matsui, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 10/874,759

(22) Filed: Jun. 24, 2004

(65) Prior Publication Data

US 2005/0035269 A1 Feb. 17, 2005

(30) Foreign Application Priority Data

Jun. 25, 2003 (JP) .................................. P. 2003-180685

(51) Int. Cl.⁷ .................. G02B 27/40; G02B 27/64; G02B 7/04
(52) U.S. Cl. ............... 250/201.5; 250/570; 369/112.03
(58) Field of Search .......................... 250/201.5, 201.2, 250/570, 566, 555, 206, 216; 369/112.03, 112.05, 53.23, 53.28

(56) References Cited

U.S. PATENT DOCUMENTS 6,873,589 B2 * 3/2005 Nakao ................... 369/112.03

FOREIGN PATENT DOCUMENTS

| JP | 2002-123969 | 4/2002 |
|---|---|---|
| JP | 2002-245660 | 8/2002 |

* cited by examiner

*Primary Examiner*—David Porta
*Assistant Examiner*—Seung C. Sohn
(74) *Attorney, Agent, or Firm*—Morgan, Lewis & Bockius LLP

(57) ABSTRACT

In an optical pickup device provided with an optical system for guiding and focusing three-beam laser light along a predetermined route onto a recording surface of an optical disk and guiding a reflected light from the recording surface along the same route, a transparent plate, whereof a normal line is inclined by 45° with respect to an optical axis of the reflected light and is fixed in the direction in which the component of the normal line which is vertical to the optical axis is fixed to a direction of being rotated from a horizontal direction by 45° about the optical axis, is provided on the route of the reflected light between a beam splitter and an optical sensor.

4 Claims, 4 Drawing Sheets

OPTICAL PICKUP DEVICE

BACKGROUND OF THE INVENTION

1. Field of the Invention

The present invention relates to an optical pickup device for focusing laser light on a recording surface of an optical disk to perform recording and reproduction of information and, more specifically, to a technology effective to be used in an optical disk device which supports a high-capacity optical disk.

2. Description of the Related Art

In an optical pickup device in the related art, as shown in JP-A-2002-123969, a focus error signal from reflected light of an optical disk is generated using an astigmatic method, and an objective lens is moved in a focusing direction based on the focus error signal to perform focusing control. In the same manner, tracking control is performed by dividing laser light into three beams by a diffraction grating, and generating a tracking error signal based on a three spot method and a differential push-pull (DPP) method from three-beam reflected light, or generating a tracking error signal based on a phase difference detecting (DPD) method from single-beam reflected light, and then moving the objective lens in a tracking direction based on these tracking error signals.

However, in the optical pickup device disclosed in JP-A-2002-123969, in order to generate the focus error signal, it was necessary to provide a cylindrical lens or a meniscus lens on the upstream side of an optical sensor, so that astigmatism of the reflected light is directed to an angle of 45° with respect to directions of division of the optical sensor.

Since the cylindrical lens or the meniscus lens are relatively expensive, and it was necessary to perform the positional adjustment with high degree of accuracy so that a light spot of the reflected light is focused on a light receiving surface of the optical sensor, there was such problem that the cost of the optical pickup device as a whole increase significantly as a result of using these lenses.

On the other hand, there is also a known system for controlling the direction of the astigmatism of the reflected light so as to corresponds to the directions of division of the optical sensor without using the cylindrical lens or the like by rotating the direction of the entire optical system of the optical pickup by 45° about an optical axis of the objective lens. However, in this system, the following problems arise.

In other words, although the laser light used in the optical pickup device is generally generated by a semiconductor laser, the shape of the light spot of the laser light of the semiconductor laser is oval. Therefore, in the configuration in which the entire optical system is rotated by 45°, a major axis of the light spot focused onto the optical disk is inclined by 45° with respect to a data track. Such a configuration does not cause any problem in optical disks which have no fear of generating crosstalk between adjacent bits on the data track, such as CDs or DVD-ROMs. However, in the case of optical disks which require a high resolution for detecting adjacent two bits on the data track, such as writable DVD or optical disks for blue-violet laser, it is not preferable because the resolution in this direction is lowered.

A technology for generating astigmatism in the predetermined direction by setting an inclined parallel plate instead of a cylindrical lens is disclosed in JP-A-2002-245660. However, only by inclining the parallel plate, an unnecessary aberration is occurred in a sub-beam when it is applied to a three-beam system optical pickup, and hence detection of the tracking error signal based on the differential push-pull method is adversely affected.

SUMMARY OF THE INVENTION

An object of the present invention is to provide an optical pick up device of orthogonal system which can detect adjacent bits on a data track with high degree of resolution, in which the case where tracking error signals are generated by a differential push-pull method can be adequately supported while achieving a low cost without the necessity of a cylindrical lens and a meniscus lens.

In order to achieve the object described above, the present invention is an optical pickup device including a light emitting element emitting laser light, a diffraction grating for dividing the laser light into three beams, an optical system for guiding and focusing the three-beam laser light along a predetermined route onto a recording surface of an optical disk and guiding reflected light from the recording surface, a beam splitter for splitting the laser light proceeding toward the recording surface and the reflected light from the recording surface, and an optical sensor for receiving the reflected light split by the beam splitter, wherein a transparent plate is provided on a route of the reflected light between the beam splitter and the optical sensor, a normal line of the transparent plate is inclined by 45° with respect to an optical axis of the reflected light, a component of the normal line of the transparent plate extending perpendicularly with the optical axis of the reflected light is fixed to the position rotated from a reference plane, which corresponds to a track of a line segment extending along a data track of the optical disk moved along the optical axis so that the laser light is propagated, by 45° about the optical axis.

In this arrangement, the angle of astigmatism of a main beam out of three beams is 45° with respect to the above-described reference plane, and a distribution of an intensity of a sub-beam is such that an image of the sub-beam is rotated by 90° about the center of the image. In other words, with the above-described transparent plate, the effects similar to the cylindrical lens or the meniscus lens of the optical pickup device in the related art may be exerted on the three-beam reflected light. Therefore, the cylindrical lens or the meniscus lens may be eliminated and hence reduction of the cost is achieved.

When the cylindrical lens or the meniscus lens is used, positional adjustment with high degree of accuracy along the optical axis was necessary for allowing the beam to form an image on a light receiving surface of the optical sensor. However, since such positional adjustment is not necessary when the transparent plate is used, the cost can be reduced also in terms of assembling process.

The similar effects can be achieved even when the angle of inclination and the angle of rotation of the transparent plate have a margin of error of about ±5°, and the similar effects can be achieved even with a margin of error of about ±15° although the magnitude of variation in a focus error signal or a tracking error signal is slightly slowed.

More specifically, the above-described optical sensor includes a first light receiving surface divided into four areas in a matrix manner for receiving the main beam located at the center out of three-beam reflected light, and second and third light receiving surfaces divided at least into two areas for receiving the sub-beams at both ends respectively, and the focus error signal based on an astigmatic method can be obtained by detection on the first light receiving surface and the tracking error signal based on a differential push-pull method can be obtained by detection additionally on the second and third light receiving surfaces.

The second and third light receiving surfaces may be divided into two so that the parting line extends in the direction orthogonal to crossed segments of these light receiving surfaces and the above-described reference plane.

BRIEF DESCRIPTION OF THE DRAWINGS

These and other objects and advantages of this invention will become more fully apparent from the following detailed description taken with the accompanying drawings in which:

FIGS. 3A and 3B show angles of fixation of a transparent plate, in which FIG. 3A is a front view viewed in a direction in which an optical axis extends, and FIG. 3B is a side view of FIG. 3A, viewed from a direction at an angle of 45° upward and rightward.

DETAILED DESCRIPTION OF THE PREFERRED EMBODIMENTS

Figure 1:
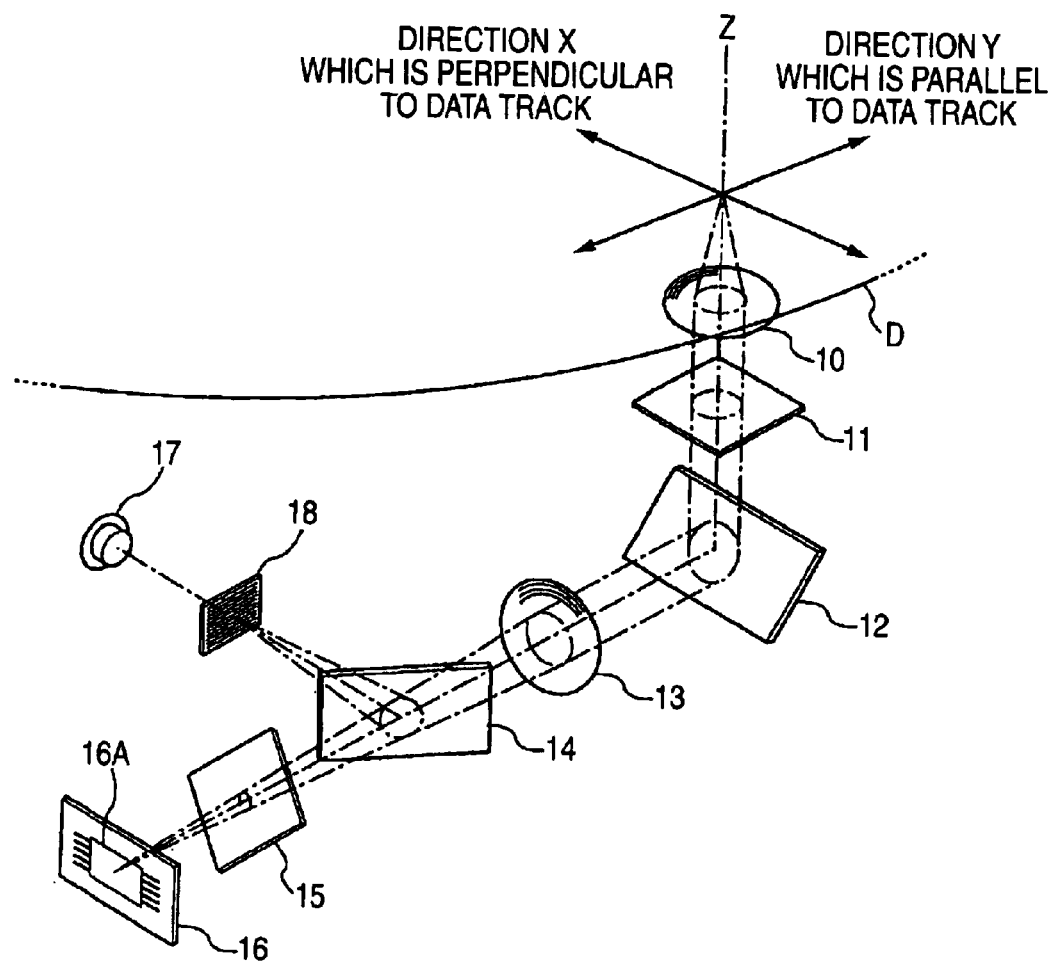
FIG. 1 is a block diagram of an optical system of an optical pickup device according to an embodiment of the present invention.

Referring now to the drawings, an embodiment of the present invention will be described.

Figure 4:
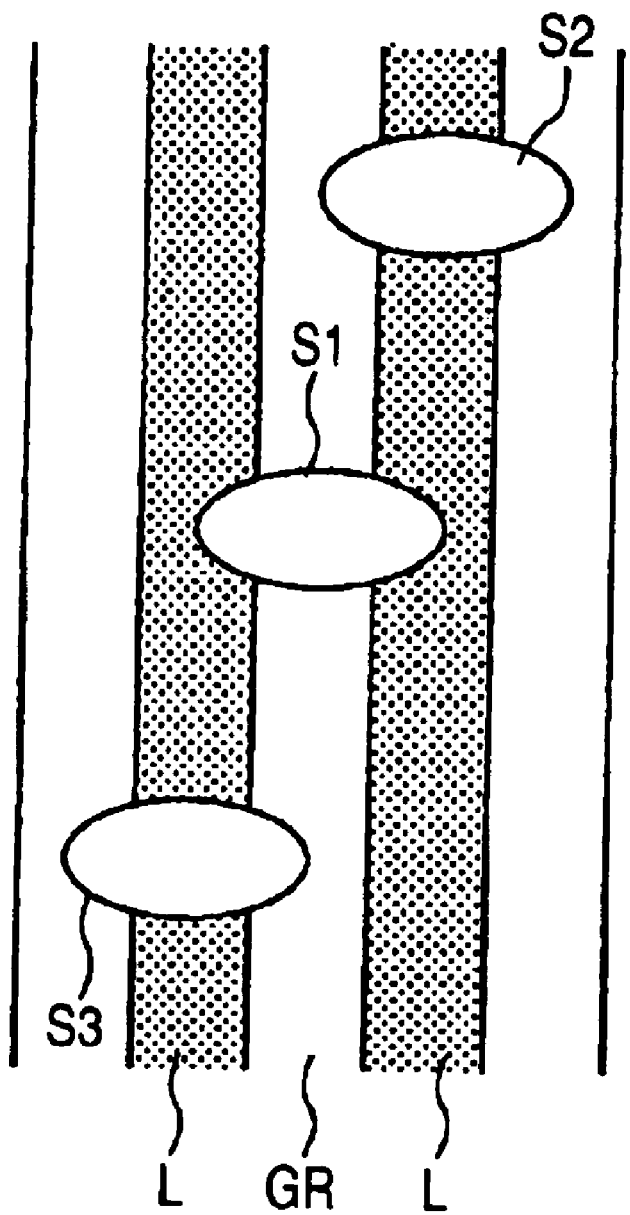
FIG. 4 is a drawing showing the shapes of light spots to be entered into a recording surface of an optical disk from the optical pickup device according to the present embodiment.

FIG. 1 is a block diagram of an optical system of an optical pickup device according to an embodiment of the present invention, and FIG. 4 schematically shows the shape of a light spot irradiated on an optical disk by the optical pickup device.

The optical pickup device of the embodiment is an optical pickup device which supports writable DVD or blue-violet laser optical disk. An objective lens 10 includes a drive unit which has a capability of servo-operation in a focus direction Z and a tracking direction X. Focus servo control uses a focus error signal generated based on an astigmatic method and tracking servo control uses a tracking error signal generated based on differential push-pull method. The astigmatic method and a differential push-pull method are known and hence detailed description will be omitted.

The optical system of the optical pickup device in this embodiment includes the objective lens 10 for focusing laser light on a recording surface of an optical disk, a quarter wave plate 11, an upright mirror 12, a collimator lens 13 for converting laser light into a parallel ray, a beam splitter 14 such as a half mirror for splitting incident light and reflected light, a transparent plate 15 to be fixed at a predetermined angle, an optical sensor 16 having three light receiving surfaces divided into a plurality of sections respectively, a semiconductor laser 17, and a diffraction grating 18 for dividing the laser light into three beams and generating tree beams.

The quarter wave plate 11 described above is used in combination with the beam splitter 14 and serves as an optical isolator. In other words, when the laser light passes through the quarter wave plate 11 outward and homeward, the reflected light is deflected in the direction in which it can easily passes through the beam splitter 14 and hence the reflected light is hardly reflected from the beam splitter 14 but is passed therethrough.

The optical pickup device of this embodiment is configured to be an orthogonal system in which the optical axis from the upright mirror 12 to the beam splitter 14 is oriented in parallel with a direction Y along the data track at a recorded data reproducing position of an optical disk D. Therefore, as shown in FIG. 4, a major axis of a light spot S1 to be irradiated on the optical disk D is orthogonal to the direction Y along the data track, and hence a resolution for detecting the adjacent two bits of a data track is increased, and MTF (modulation transfer function) of a signal for detecting the data mark at the time of the data reproduction is also increased.

The optical pickup device employs the three-beam system which irradiates a main beam and two sub-beams on the optical disk. As shown in FIG. 4, the light spot S1 which corresponds to the main beam is irradiated on a group GR in which information is stored, and light spots S2, S3 which correspond to the sub-beams are irradiated on lands L, L for tracking control.

Figure 2:
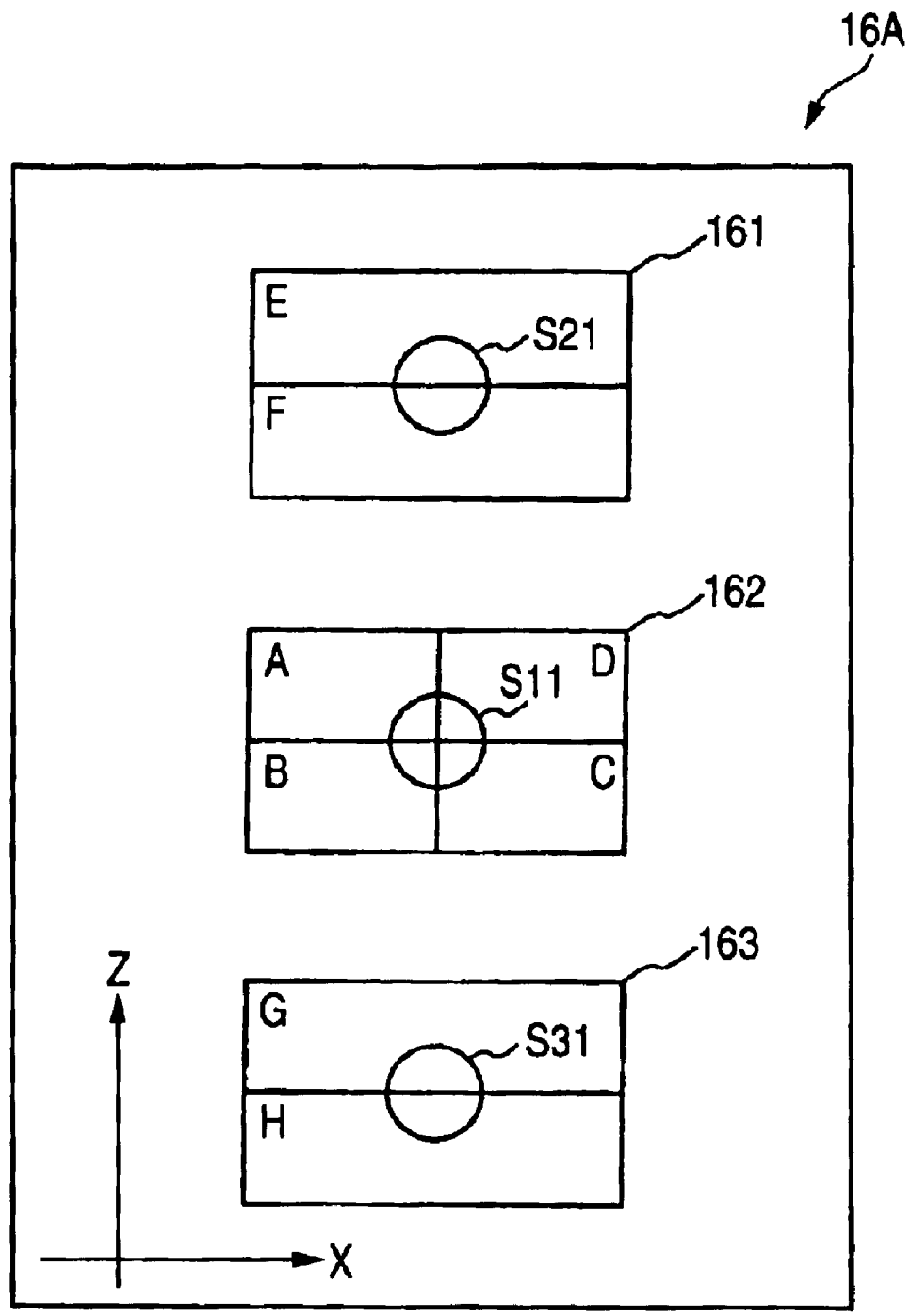
FIG. 2 is a block diagram of light receiving surfaces of an optical sensor.

FIG. 2 is a block diagram of light receiving surfaces of the optical sensor 16.

The optical sensor 16 includes three light receiving surfaces 161, 162, 163 arranged in a vertical direction (Z direction) for detecting three beams reflected from the optical disk D. Then, when the reflecting light is collected to the collimator lens 13, the main beam of the reflected light is imaged on the light receiving surface 16 at the center, and the sub-beams of the reflected light are imaged on the upper and lower light receiving surfaces 161, 163.

The light receiving surface 162 at the center is divided into four areas A–D in a matrix manner, and is adjusted in position so that a light spot S11 of the main beam comes to the center.

The upper light receiving surface 161 is divided into two areas of upper and lower areas E, F, and the lower light receiving surface 163 is divided into two areas of upper and lower areas G, H. The positions of light spots S21 and S31 of the sub-beams are adjusted to straddle equally over these two areas. Parting lines are oriented so as to be orthogonal to a reference plane (a surface along a direction Z in FIG. 2), the reference plane being a track of the segment, which extends in the Y-direction on the optical disk, moved along the optical axis of the reflected light so that the reflected light is propagated from the recording surface.

Figure 3A:
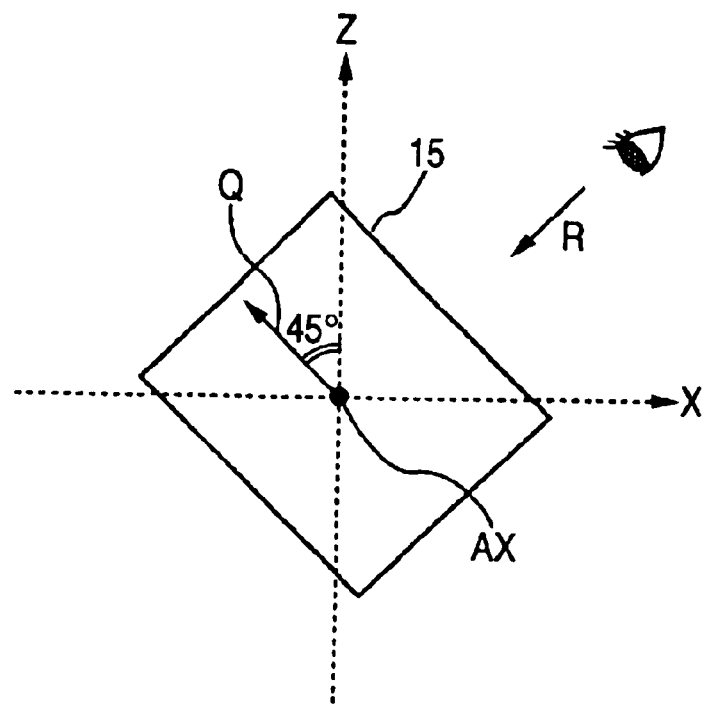
Figure 3B:
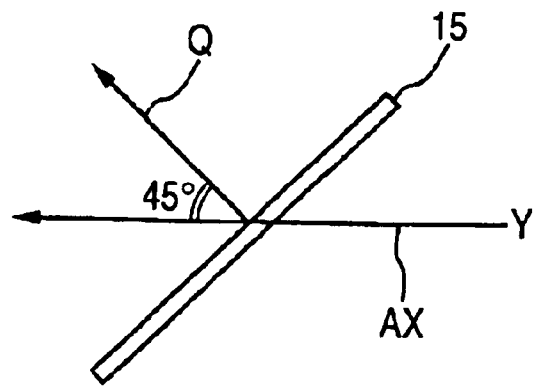

FIGS. 3A and 3B show angles of fixation of the transparent plate 15. FIG. 3A is a front view viewed in a direction in which the optical axis extends, and FIG. 3B is a side view of FIG. 3A, viewed from a direction R at an angle of 45° upward and rightward.

The transparent plate 15 is a transparent parallel plate, and has following characteristics in angle of fixation thereof. In other words, the normal line Q is inclined at an angle of 45° with respect to an optical axis AX of the reflected light. Furthermore, the component orthogonal to the optical axis AX of a normal line Q is set to an angle rotated from a reference plane (the surface extending along a Z-axis in FIG. 3A) by 45° about the optical axis AX, the reference plane being a track of the segment, which extends from the recording surface of the optical disk in the Y direction, moved along the optical axis AX of the reflected light so that the reflected light propagates.

Subsequently, a method of obtaining the focus error signal and the tracking error signal respectively in the optical pickup device configured as described above will be described.

The focus error signal can be obtained by detecting the strengths of the respective divided areas A to D by receiving the main beam on the light receiving surface 162 at the center of the optical sensor 16. In other words, since the main beam is provided with an astigmatism of 45° with respect to the parting line of the light receiving surface 162 by the beam splitter 14 and the transparent plate 15, the focus error signal of (IA+IC)−(IB+ID) is obtained by the astigmatic method based on optical strengths IA to ID of the respective divided areas A to D.

Subsequently, the tracking error signal can be obtained by detecting the strengths of the main beam in the respective divided areas A to D and by detecting the strengths of the two sub-beams received in the respective areas E, F and G, H on the upper and lower light receiving surfaces 161, 163. In other words, when the transparent plate 15 is inclined by 45° with respect to the optical axis AX and is rotated by 45° about the optical axis AX, the distribution of the strengths of the light spots S21, S31 of the sub-beams rotates by 90° as the images thereof rotate. Therefore, based on an optical detection in the respective areas of the light receiving surfaces 161, 163 divided as shown in FIG. 2, a tracking error signal of {(IE−IF)+(IG−IH)}−k{(IA+ID)−(IB+IC)} is obtained based on the differential push-pull method. Here, reference signs "IE to IH" represent the optical strength of the respective areas E to H.

Then, when the focus error signal and the tracking error signal are supplied to a circuit for servo controlling of the objective lens 10 and the objective lens 10 is driven in the focus direction Z and the tracking direction X, focusing and tracking of the main beam are aligned with the data track.

As described above, in the optical pickup device of orthogonal system which can detect the adjacent two bits on the data track with high degree of resolution according to the present embodiment, since astigmatism of the main beam in a predetermined direction is obtained by the transparent plate 15, the cylindrical lens or the meniscus lens are not necessary, whereby cost reduction is achieved. When the cylindrical lens or the meniscus lens is used, while the positional adjustment of the cylindrical lens or the meniscus lens were necessary in addition to the positional adjustment of the optical sensor 16 or the collimator lens 13 so that the focus of the reflected light is aligned with the optical sensor 16, the positional adjustment as such is not necessary for the transparent plate 15, whereby cost reduction in the assembling process is also achieved.

With the transparent plate 15 which is inclined by 45° and is rotated by 45°, distribution of the strengths of the light spots of the sub-beams are brought into a state of being rotated by 90° as the images are rotated by 90°, whereby the tracking error signal can be obtained based on the differential push-pull method by the optical sensor 16 having the light receiving surfaces divided as shown in FIG. 2.

The present invention is not limited to the above-described embodiment, and various modifications may be implemented. For example, the embodiment described above is configured in such a manner that optical axes of emitted light from the semiconductor laser 17 and the reflected light entering the optical sensor 16 are oriented in parallel with the optical disk surface of the optical disk by the presence of the upright mirror 12. However, it is also possible to eliminate the upright mirror 12 and the optical axis from the collimator lens 13 to the optical sensor 16 may be oriented vertically like the optical axis of the objective lens 10. A configuration in which the emitted light from the semiconductor laser 17 is passed through the beam splitter and the reflected light from the beam splitter is received by the optical sensor 16 is also applicable.

The similar effects can be achieved even when the angle of inclination and the angle of rotation of the transparent plate have a margin of error of about ±5°, and the similar effects can be achieved even with a margin of error of about ±15° although the magnitude of variation in focus error signal or the tracking error signal is slightly slowed.

As described above, according to the present invention, in the optical pickup device of the orthogonal system, which can detect the adjacent bits on the data track with high degree of resolution, there are such effects that the cylindrical lens or the meniscus lens may be eliminated and hence reduction of the cost is achieved, and it can support the case of generating the tracking error signal is generated by the differential push-pull method.

What is claimed is:

1. An optical pickup device comprising:

a light emitting element emitting laser light;

a diffraction grating for dividing the laser light into three beams;

an optical system for guiding and focusing the three-beam laser light along a predetermined route onto a recording surface of an optical disk and guiding reflected light from the recording surface;

a beam splitter for splitting the laser light proceeding toward the recording surface and the reflected light from the recording surface;

an optical sensor for receiving the reflected light split by the beam splitter; and a transparent plate, wherein:

the transparent plate is provided on a route of the reflected light between the beam splitter and the optical sensor;

a normal line of the transparent plate is inclined by 45±5° with respect to an optical axis of the reflected light, a component of the normal line of the transparent plate extending perpendicularly with the optical axis of the reflected light is fixed to the position rotated from a reference plane, which corresponds to a track of a line segment extending along a data track of the optical disk moved along the optical axis so that the laser light is propagated, by 45±5° about the optical axis;

the optical sensor comprises a first light receiving surface divided into four areas in a matrix manner for receiving a main beam at the center of three-beam reflected light, and second and third light receiving surfaces divided in such a manner that the parting line extends in the direction orthogonal to the reference plane for receiving the sub-beams of the three beams other than the main beam, respectively; and the focus error signal can be obtained based on an astigmatic method by detection on the first light receiving surface and the tracking error signal can be obtained based on a differential push-pull method by detection on the second and third light receiving surfaces.

2. An optical pickup device comprising:

a light emitting element emitting laser light;

a diffraction grating for dividing the laser light into a plurality of beams;

an optical system for guiding and focusing the laser light of the plurality of beams along a predetermined route onto a recording surface of an optical disk and guiding reflected light from the recording surface;

a beam splitter for splitting the laser light proceeding toward the recording surface and the reflected light from the recording surface, and an optical sensor for receiving the reflected light split by the beam splitter; and a transparent plate, wherein:

the transparent plate is provided on a route of the reflected light between the beam splitter and the optical sensor; and a normal line of the transparent plate is inclined by 30°–60° with respect to an optical axis of the reflected light, a component of the normal line of the transparent plate extending perpendicularly with the optical axis of the reflected light is fixed to the position rotated from a reference plane, which corresponds to a track of a line segment extending along a data track of the optical disk moved along the optical axis so that the laser light is propagated, by 30°–60° about the optical axis.

3. An optical pickup device according to claim 2, wherein the diffraction grating is configured to divide the laser light into three beams;

the optical sensor includes the first light receiving surface divided into four areas in a matrix manner for receiving a center beam out of the three-beam reflected light, and the second and third receiving surfaces divided at least into two areas for receiving the sub-beams respectively; and the focus error signal based on the astigmatic method can be obtained by detection on the first light receiving surface and the tracking error signal based on the differential push-pull method can be obtained by detection additionally on the second and the third light receiving surfaces.

4. An optical pickup device according to claim 3, wherein the second and third light receiving surfaces are set so that the parting line intersects with the reference plane.

* * * * *